United States Patent [19]

Wagner

[11] 4,006,923
[45] Feb. 8, 1977

[54] COUPLING CONSTRUCTION

[76] Inventor: John B. Wagner, 33-9th St., Racine, Wis. 53233

[22] Filed: Oct. 29, 1975

[21] Appl. No.: 626,969

[52] U.S. Cl. ................................. 285/39; 29/507; 285/258
[51] Int. Cl.² ......................................... F16L 33/20
[58] Field of Search ............ 285/258, 382.4, 382.5, 285/39; 29/507, 523

[56] References Cited

UNITED STATES PATENTS

| 1,794,849 | 3/1931 | Hagstedt | 285/382.4 X |
| 1,951,833 | 3/1934 | Maupin | 285/382.4 X |
| 2,146,756 | 2/1939 | Miller | 285/258 |
| 2,228,018 | 1/1941 | Scholtes | 285/382.4 X |
| 2,683,928 | 7/1954 | Carson | 29/523 |
| 2,766,804 | 10/1956 | Kaiser | 285/258 X |
| 2,916,816 | 12/1959 | Black et al. | 29/507 |
| 3,490,793 | 1/1970 | Wagner | 285/258 X |

*Primary Examiner*—Thomas F. Callaghan
*Attorney, Agent, or Firm*—Seymour Rothstein

[57] ABSTRACT

A hose coupling for hoses handling relatively high fluid pressures, which hose coupling embodies a cup-shaped body having primary and secondary internal grooves in a wall defining a chamber, and a tubular pressure element having a deformable externally grooved end portion at one end, an intermediate externally tapered portion, and a collapsible end portion. The deformable grooved end portion is adapted to squeeze material into the primary grooves. The collapsible end portion is adapted to squeeze material into the secondary grooves so as to enhance the securement and sealing of the hose relative to the hose coupling. Ball means movable axially within the hose coupling are adapted to cause axial movement of the tubular pressure element so as to initially collapse the collapsible end portion thereof and subsequently, to deform the deformable grooved end portion. The ball means is adapted to be actuated by a rod that is releaseable therefrom, or alternatively, the ball means may be provided on a tubular coupling member that is adapted to extend through an opening in the end wall of the coupling and be actuable externally of the body.

9 Claims, 6 Drawing Figures

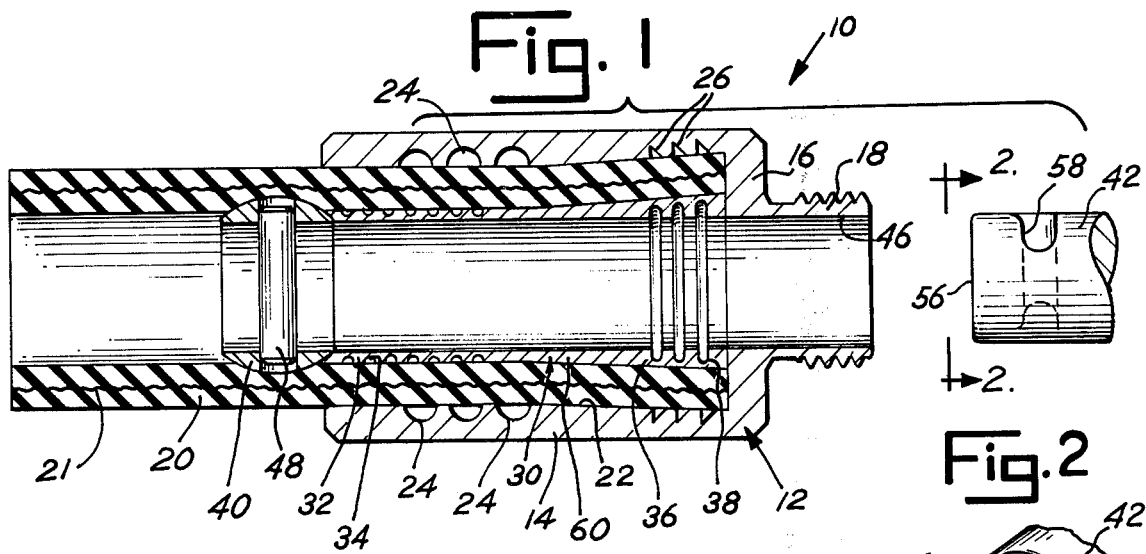
Fig. 1
Fig. 2
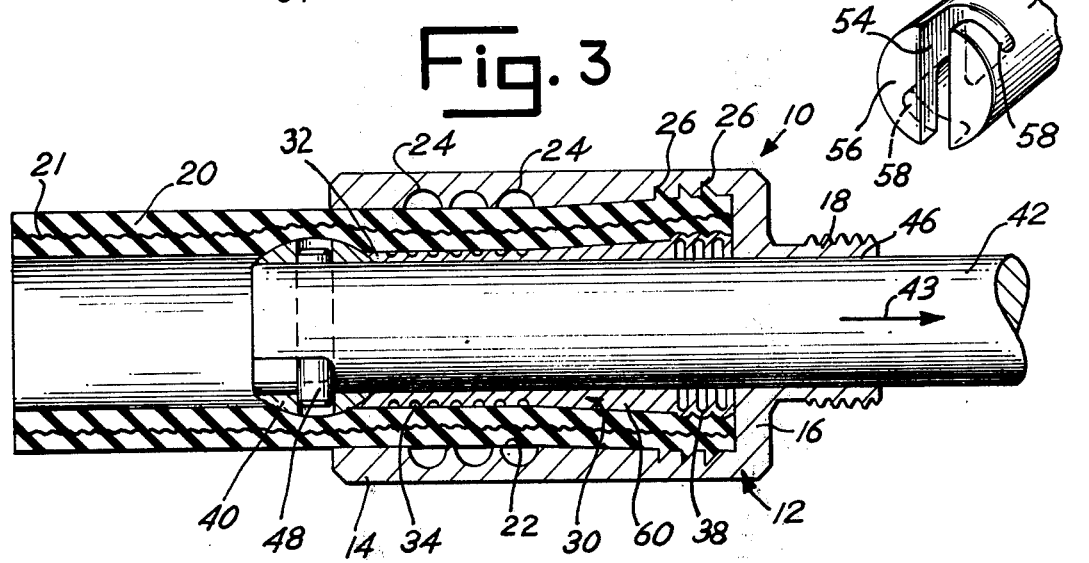
Fig. 3
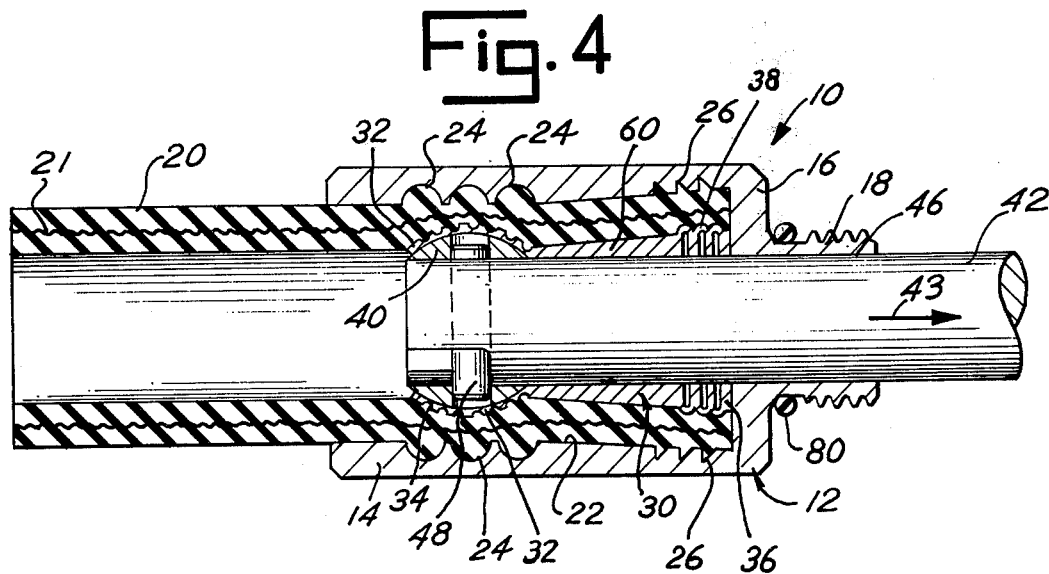
Fig. 4

COUPLING CONSTRUCTION

BACKGROUND AND SUMMARY OF THE INVENTION

This invention relates to couplings for fluid conduits such as hoses used for transferring liquids or gases under pressure or vacuum. Such couplings are utilized for connecting conduits in hydraulic systems, for example, to hydraulic cylinders, pumps and tanks.

There is disclosed in my U.S. Pat. No. 3,490,793, patented Jan. 20, 1970, a hose coupling similar to that of the present invention. The hose coupling of my patent, which represents a substantial improvement over couplings of earlier designs, comprises a cup-shaped body having a cylindrical chamber with an open end therein telescoping over the end of a hose. A tubular pressure element is provided in the chamber. Such tubular pressure element has an inner end portion of deformable material. A ball is adapted to deform the inner end portion of the tubular pressure element so as to cause hose material to flow into grooves in the interior wall of the cylindrical chamber.

Under certain operating conditions, for example, very high bursting pressures in the hose, there has sometimes been failure of the seal between the hose and the body.

One of the objects of this invention is to provide an improved hose coupling which provide greatly increased securing force on the hose attached within the hose coupling so as to be capable of enhanced sealing and reliability when used under extremely high bursting pressure conditions.

Another object of the present invention is to provide an improved hose coupling which includes a body and a pressure element having a deformable wall portion at one end forming primary hose retaining means in cooperation with primary internal grooves in the body and a collapsible wall portion at the other end forming secondary retaining means in cooperation with secondary internal grooves in the body, said collapsible wall portion being collapsed initially during assembly.

A further object of this invention is to provide an improved hose coupling for a wire braided and spiral reinforced hose that will withstand very high bursting pressures and will grip the hose material, such as rubber or like synthetic material without gripping the wire braiding or spiral reinforcing material, so as to provide for enhanced sound attenuation for certain applications where sound might otherwise be transmitted from the wire braided or spiral reinforced hose to the coupling body.

Other objects and advantages of the present invention will become apparent from the following description taken in conjunction with the accompanying drawing in which:

BRIEF DESCRIPTION OF THE DRAWING

FIG. 1 is a cross-sectional view showing the various components of the hose coupling in an initial position with respect to the end of a hose, preparatory to moving the pull rod to effect engagement of the hose within the body of the hose coupling;

FIG. 2 is a perspective view of the end of the pull rod of FIG. 1;

FIG. 3 is a cross-sectional view showing the various components of the hose coupling in an intermediate position of assembly, with the collapsible end portion of the pressure element collapsed so as to force material into the cooperating grooves in the interior cylindrical wall of the coupling body;

FIG. 4 is a cross-sectional view similar to FIG. 3 showing the assembled and attached hose coupling;

DETAILED DESCRIPTION OF THE PREFERRED EMBODIMENT

Figure 5:
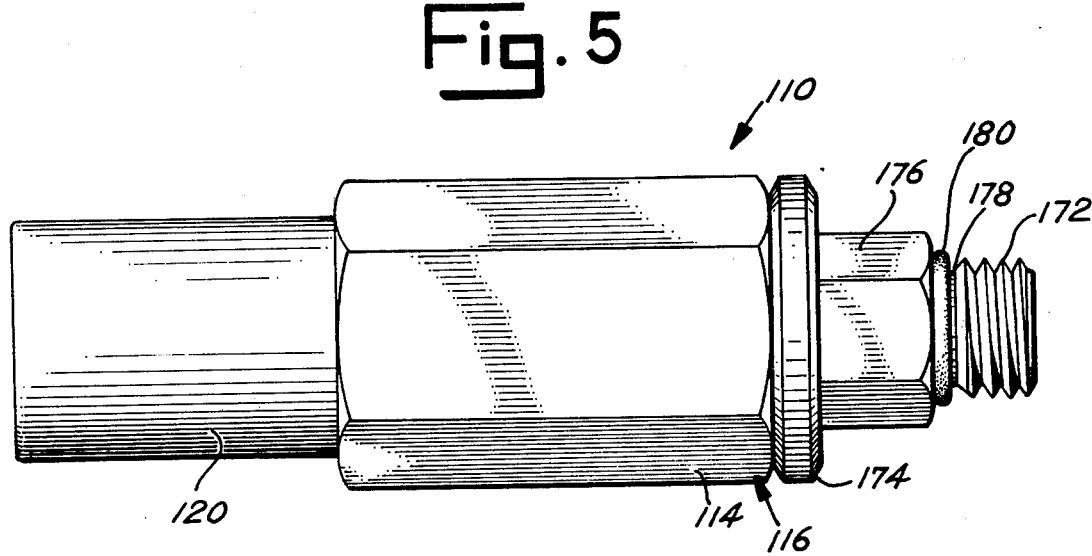
FIG. 5 is an elevation view of a modified hose coupling embodying principles of the present invention.

Referring to FIGS. 1, 3 and 4 there is illustrated a hose coupling 10 embodying the principles of the present invention. The hose coupling 10 comprises a generally cup-shaped body or ferrule 12 having a cylindrical wall portion 14 and an end wall 16. Projecting from the end wall 16 is a reduced diameter externally threaded portion 18 which provides for connecting the body 12 to a separate hose in a hydraulic or the like system. The end of the hose 20 is adapted to be secured within the body 12. Such hose may be made from a suitable material such as rubber or synthetic rubber and for high bursting pressure applications, the hose may be of a type having wire braiding or wire mesh 21 embedded therein or spiral reinforced.

The chamber 22 in the body 12 has an inner cylindrical wall whose diameter is approximately equal to the outer diameter of the hose 20. Provided in the inner wall defining the chamber 22 are a first plurality of annular grooves or recesses 24 and a second plurality of grooves or recesses 26. The first plurality of grooves 24 may each be of generally hemispherical configuration in cross-section as viewed in FIGS. 1, 3 and 4 and the second plurality of grooves 26 may be of a sawtooth configuration in cross section as viewed in FIGS. 1, 3 and 4.

With reference to FIG. 1, there is disposed within the free end of the hose 20 a tubular pressure element 30, which has a deformable inner end portion 32 having a plurality of circumferential grooves 34 thereon and a collapsible end portion 36 adjacent the end wall 16 of the ferrule or body 12 which has a plurality of annular grooves 38 therein.

The pressure element 30 may be formed of suitable metallic material, for example, annealed tubing, which possesses ductile characteristics capable of withstanding high fluid pressures. The pressure element may be formed of copper, bronze or brass, or, under less demanding conditions, a synthetic material.

Initially, a ball member 40 is positioned in the end of the hose 20 and then the pressure element 30 is placed in hose 20 abutting ball member 40 and the pressure element 30 is pushed into the hose 20 until the end thereof is flush with the end of the hose. The end of pressure element 30 abutting end wall 16 may be brazed or otherwise affixed to the end wall 16. The end of the pull rod 42 is adapted to extend through the opening 46 within the cylindrical portion 18 of the end wall 16 of the body 12 for releasably engaging with the pin 48 operatively connected to the ball 40.

With the pull rod 42 engaged with the pin 48 and a force exerted to the right as indicated by the arrow 43 in FIG. 3, an axial force will be exerted upon the pressure element 30 by ball member 40 causing collapse or compression of the collapsible portion 36. Material at the end of the hose will flow into the circumferential grooves 26 in the cylindrical wall of chamber 22. Upon continued movement of the pull rod 42 and the ball member 40 attached thereto, to the right as indicated in FIG. 4, the ball member 40 will enter the deformable end portion 32 of the pressure element 30 (which may be counterbored to provide an enlarged entry) and be moved therein so as to cause the pressure element 30 to assume a curved contour complementary to that of the exterior of the ball member 40 so as to force the resilient material of the hose 20 to flow into the circumferential grooves 24 in the body or ferrule 12. When assembled, the ends of pressure element 30 and the hose 20 abut end wall 16.

With reference to FIGS. 1 and 2, it will be observed that the pull rod 42 may be rotated relative to the pin 48 to effect engagement of the pin 48 and release thereof when desired so as to permit removal of the pull rod 42 from the pin 48. The end of the pull rod 42 has a diametrically disposed slotted opening 54 in the end face 56 which has a width slightly greater than the diameter of the pin 48 so as to receive the pin 8 therein. The slot 54 is of a depth from end face 56 greater than the diameter of pin 48. The slot 54 is formed with opposed sector portions 58 that are offset approximately 30°–45°, from the axis of the opening to slot 54, whereby the pull rod 42 can be assembled and disassembled from the pin 48 through a rotational movement of approximately 30°–45°, relative to the pin 48.

The relative proportions and configurations of the components of the hose coupling are important in order to enable the desirable results to be obtained. Initially, it is observed that the outer diameter of the deformable portion 32 of the pressure element 30 is approximately equal to the inner diameter of the bore of the hose 20 as seen in FIG. 1. Between the deformable portion 32 of the pressure element 30 and the collapsible portion 36 thereof, there is a tapered portion 60 that gradually increases in diameter toward the outer end. The major portion of the length of the tapered section 60 of the pressure element 30 is of a diameter that is slightly greater than the diameter of the bore of the hose 20. The angle of the tapered portion of the pressure element 30 is in the range of 2° to 15°, depending upon the thickness and physical characteristics of the hose 20 to which the hose coupling 10 is to be applied.

It will be observed that neither the pressure element 30 nor the body 12 are in contact with the wire mesh or reinforcing braiding 21 in hose 20. Noise will not be transmitted between the body 12 and the wire braiding 21 with hose 20. Such hose coupling is desirous in applications where sound attenuation is desired.

Figure 6:
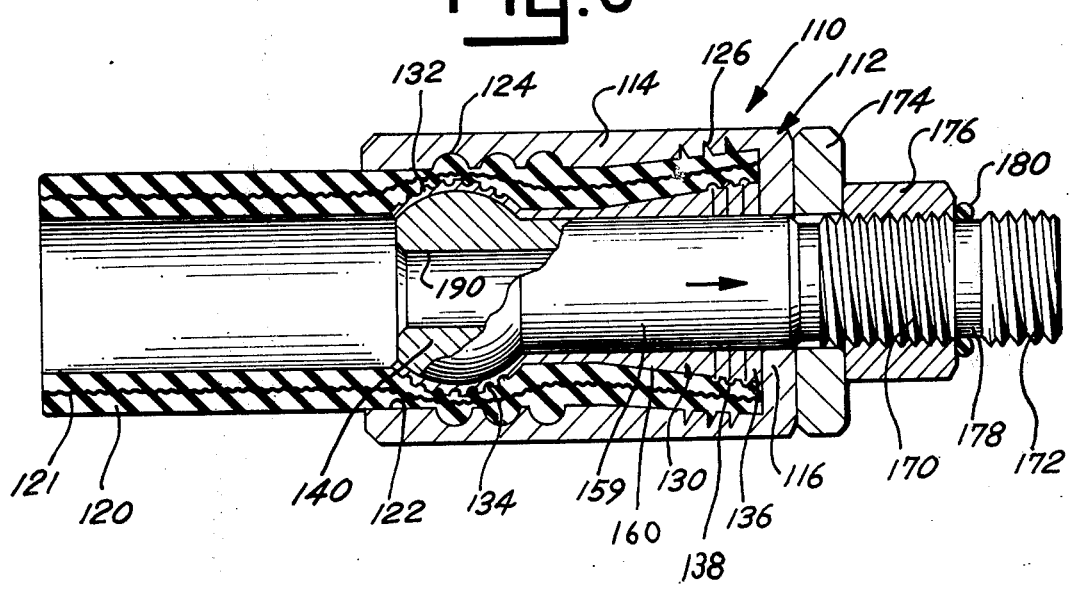
FIG. 6 is a cross-sectional view showing the assembled and attached position of the hose coupling of FIG. 5.

Referring now to FIGS. 5 and 6, there is illustrated a modification of the invention of FIGS. 1–4. The hose coupling 110 is very much like the hose coupling 10 except that the ball member 140 is formed integral with a coupling member 159 that is adapted to join the tubular pressure element 130, hose 120 and body 112 to one another, rather than being separable from the pull rod as in the embodiment of FIGS. 1–4. The body or ferrule 112 is comprised of a cup-shaped member having a cylindrical portion 114 and an end wall 116. Preferably, the body is made from metal such as copper alloy, brass, stainless steel or the like. The hose 120 and the tubular pressure member 130 are substantially the same as that of the embodiment of FIGS. 1–4 and accordingly, where appropriate, like elements will be designated by the same numberals except for the prefix 1. The hose 120 may comprise a core reinforced with a braiding of wire or plastic and enclosed by a sturdy protective covering.

The coupling member 159 is generally tubular and is provided at one end with a ball portion 140. Preferably, such coupling member is made from metal, such as copper, alloy, stainless steel, or the like. The other end of the coupling member 150 is provided externally with spaced apart threaded portions 170 and 172. A spacer 174 is positioned over the coupling member 159 and has an opening therethrough which has a diameter slightly larger than the external diameter of the threads 170. The nut 176 is threaded upon the threads 170 and abuts the spacer 174. When nut 176 is rotated toward body 112, it will cause the ball portion 140 to be drawn into the tubular pressure element of locking sleeve 130 so as to provide the completed assembled hose coupling 110 as viewed in FIG. 6. A recess 178 is provided between the externally threaded portions 170 and 172 on the coupling 159. An O-ring 180 may be positioned in the groove 178. A hose can be coupled onto the threaded end 172 of coupling member 159 so as to complete the assembly in a hydraulic system. The O-ring 180 serves as a seal against leakage of fluid about coupling member 159 when an attached hose is connected to threaded portion 172.

In order to assemble the hose coupling 110 of FIGS. 5 and 6, the locking sleeve or tubular pressure element 130 is positioned over the coupling member 159 abutting the ball portion 140 and the coupling member 159 and the locking sleeve 130 are forced into the end of the hose 120. The subassembly comprising the coupling member 159, the pressure element 130 and the hose 120 are then slid through the open end of the cup-shaped body 112 into the chamber 122 within the body or ferrule 112. The spacer 174 is then positioned over the coupling 159 abutting the exterior of end wall 116 and the nut 176 is threaded upon the threads 170, which have a sufficient axial extent to insure sufficient axial movement of the ball portion member 140 from a position abutting the end of the locking sleeve or pressure element 130 to a final assembled position as illustrated in FIG. 6. The nut 176 is rotated relative to the coupling 150 until the position of FIG. 6 is attained.

During initial movement of the coupling member 159 relative to the locking sleeve 130, the collapsible end portion 136 will be compressed or collapsed so as to cause the ridges or grooves externally thereof to force material of the hose 120 to flow into the grooves 126 defined in the internal wall forming the chamber 122 within the ferrule or body 112 in substantial transaxial registration with the ridges defined on the collapsed end portion 136 of locking sleeve or pressure element 130. Upon continued movement of the ball member 140 into locking sleeve 130, the deformable inner end 132 of the locking sleeve 130 is bulged outwardly or deformed so as to cause the material of the hose to flow into the grooves 124 which were located in transaxial registration with the grooves 134 on the inner end portion 132 of the tubular pressure element or pressure locking sleeve 130. The hose material between the collapsible end portion 136 and the deformable end portion 132 of the locking sleeve 130 is displaced due to the tapered external configuration of the portion 160, with the result that there is a firm securing and sealing provided between the components of the hose coupling. The ends of the locking sleeve 130 and hose 120 firmly abut end wall 116 so as to provide an additional sealing surface. Neither the locking sleeve 130 nor the body 112 contact the wire braiding 121 in hose 120. Bore 190 in the tubular coupling member 159 provides a continuation of the bore within hose 120 so as to provide fluid communication to the hose or device affixed to threaded portion 172.

There has been provided by the present invention an improved hose coupling which includes primary holding and sealing means between deformable end 132 of sleeve 130 and body 112 and secondary holding and sealing means between collapsible end portion 136 and body 112 to permit the hose coupling to withstand very high bursting pressures for example, on the order of 19,000 – 20,000 psi. and higher, and to provide such hose coupling with long life. Also, there has been provided an improved method of assembling a hose to a coupling body so as to provide a coupling construction able to withstand high bursting pressures.

While I have shown and described presently preferred embodiments of my invention, it will be apparent to those skilled in the art that the invention is capable of modification without departing from the spirit and scope thereof.

I claim:

1. In a hose coupling comprising a body having a cylindrical chamber with an open end for telescoping over an end of a hose and an end wall at the other end of said chamber, and a tubular pressure element in said chamber having an inner end portion of deformable material, said deformable end portion being deformed so as to cause the aligned portion of the hose to be firmly squeezed and displaced against the cylindrical wall of the chamber of said body to firmly secure the body, the hose, and the pressure element in fixed relation to each other, the inner cylindrical wall of said chamber and the external surface of said pressure element, outwardly of the deformable inner end portion, being dimensionally related to provide an axially tapering annular space, converging toward the end wall of the body, which is less than the thickness of the wall of the hose to which the hose coupling is supplied, a portion of the pressure element outwardly of said deformable inner end portion being tapered and having a surface increasing in diameter toward the end wall of said body, and the maximum diameter of said tapered portion being greater than the normal internal diameter of the hose to which the coupling is applied, the inner cylindrical wall of said chamber being provided with a first plurality of grooves spaced from the end wall and located in transaxial registration with said deformable inner end portion of said pressure element, into which the material of the hose is caused to flow incident to affixing the pressure element within the body, the outer surface of the deformable inner end portion being provided with a plurality of first grooves remote from the end wall, the improvement comprising a collapsible wall portion on the tapered portion of the pressure element adjacent the end wall of the body and a second plurality of grooves in the inner cylindrical wall adjacent the end wall of the body, the collapsible wall portion defining ridges when collapsed to cause hose material to flow into the second grooves and thereby provide secondary means for securing and sealing the hose relative to the body.

2. A hose coupling as in claim 1 including a tubular coupling member extending through an opening in the end wall of the body, said coupling member including a ball portion for engaging the pressure element, said coupling member having a bore therethrough.

3. A hose coupling as in claim 2 wherein the tubular coupling member is externally threaded and a nut cooperates with the external threads to move the tubular coupling member axially relative to said body.

4. A hose coupling as in claim 3 including a spacer provided between said nut and said body.

5. A hose coupling as in claim 4 including a threaded portion on said coupling member for receiving a hose in a fluid system.

6. A hose coupling as in claim 1 wherein the first plurality of grooves are annular in the inner cylindrical wall and are hemispherical in cross-section.

7. A hose coupling as in claim 1 wherein the second plurality of grooves are annular in the inner cylindrical wall and are sawtooth in cross-section.

8. A hose coupling as in claim 1 including ball means for moving the pressure element axially to collapse said collapsible end portion and to deform said deformable end portion.

9. A hose coupling as in claim 8 wherein the ball means includes a ball member and pin means, said pin means being adapted to be releaseably engaged by a pull rod.

* * * * *